United States Patent
Selvaiyya et al.

(10) Patent No.: US 10,038,935 B2
(45) Date of Patent: Jul. 31, 2018

(54) SYSTEM AND METHOD FOR REAL-TIME TRANSFER OF AUDIO AND/OR VIDEO STREAMS THROUGH AN ETHERNET AVB NETWORK

(71) Applicant: Tata Consultancy Services Limited, Mumbai (IN)

(72) Inventors: Senthil Kumar Selvaiyya, Bangalore (IN); Vinay Kumar Nagaraj, Bangalore (IN); Shitij Sah, Bangalore (IN); Prashant Wilson Crastap, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 62 days.

(21) Appl. No.: 15/015,750

(22) Filed: Feb. 4, 2016

(65) Prior Publication Data

US 2017/0064386 A1    Mar. 2, 2017

(30) Foreign Application Priority Data

Aug. 27, 2015   (IN)  .......................... 3288/MUM/2015

(51) Int. Cl.
*H04N 21/4223*   (2011.01)
*H04N 21/44*   (2011.01)
(Continued)

(52) U.S. Cl.
CPC . *H04N 21/44004* (2013.01); *H04L 12/40091* (2013.01); *H04L 12/40143* (2013.01);
(Continued)

(58) Field of Classification Search
CPC ....... H04N 21/44004; H04N 21/41422; H04N 21/4223; H04N 21/43632;
(Continued)

(56) References Cited

U.S. PATENT DOCUMENTS 7,646,715 B2    1/2010    Oueslati et al.
7,944,935 B2    5/2011    Bucknell et al.
(Continued)

FOREIGN PATENT DOCUMENTS

WO    WO 2014/117347    8/2014

OTHER PUBLICATIONS

Lo Bello, L. et al., (2013). "Introducing A support for time-sensitive traffic over ethernet switches : The case of IEEE AVB," located at <https://ece.uwaterloo.ca/~sfischme/rate/LuciaLoBelloRATE2013_presentation_LLBfinal.pdf> visited on Feb. 3, 2016. (20 pages).

(Continued)

*Primary Examiner* — Nathan Flynn
*Assistant Examiner* — Tung T Trinh
(74) *Attorney, Agent, or Firm* — Finnegan, Henderson, Farabow, Garrett & Dunner LLP (57) ABSTRACT

The disclosure relates generally to transfer of audio and/or video streams, and, more particularly, to system and method for real-time transfer of the audio and/or video streams through an Ethernet audio/video bridging (AVB) network. In one embodiment, multiple audio and/or video streams from multiple AVB enabled devices are received by an AVB enabled network device. Each of the multiple AVB enabled devices has a static priority based on criticality of an application that each of the multiple AVB enabled devices is performing. Further, each of the multiple audio and/or video streams is dynamically queued, by the AVB enabled network device, based on the static priority of the associated one of the AVB enabled devices. Furthermore, real-time transfer of the multiple audio and/or video streams to a user device is enabled, by the AVB enabled network device, through an Ethernet AVB network upon queuing the multiple audio and/or video streams.

11 Claims, 7 Drawing Sheets

(51) Int. Cl.
H04L 29/06 (2006.01)
H04L 12/40 (2006.01)
H04L 12/46 (2006.01)
H04L 12/927 (2013.01)
H04N 21/414 (2011.01)
H04N 21/4363 (2011.01)

(52) U.S. Cl.
CPC .......... H04L 12/462 (2013.01); H04L 47/803 (2013.01); H04L 47/805 (2013.01); H04L 65/103 (2013.01); H04L 65/605 (2013.01); H04L 65/80 (2013.01); H04N 21/41422 (2013.01); H04N 21/4223 (2013.01); H04N 21/43632 (2013.01)

(58) Field of Classification Search
CPC ............. H04L 12/40091; H04L 12/462; H04L 47/803; H04L 65/103
USPC .......................................................... 725/75
See application file for complete search history.

(56) References Cited

U.S. PATENT DOCUMENTS

| | | | |
|---|---|---|---|
| 8,165,148 B2 | 4/2012 | Jain et al. | |
| 8,392,631 B1* | 3/2013 | Mora | G06F 13/00 709/228 |
| 8,626,922 B2 | 1/2014 | Short et al. | |
| 9,565,035 B1* | 2/2017 | Pannell | H04L 49/201 |
| 2007/0291644 A1 | 12/2007 | Roberts et al. | |
| 2008/0288638 A1 | 11/2008 | Diab et al. | |
| 2009/0180389 A1* | 7/2009 | Mack-Crane | H04L 47/10 370/242 |
| 2010/0165906 A1* | 7/2010 | Chu | H04L 47/10 370/312 |
| 2011/0261814 A1 | 10/2011 | Matthews et al. | |
| 2012/0109406 A1* | 5/2012 | Yousefi | H04N 7/183 701/1 |
| 2012/0230348 A1* | 9/2012 | Pannell | H04L 47/6215 370/437 |
| 2013/0044582 A1 | 2/2013 | Ahmed | |
| 2013/0117408 A1* | 5/2013 | Kniplitsch | H04L 67/322 709/217 |
| 2013/0339537 A1* | 12/2013 | Joy | H04L 65/1083 709/231 |
| 2014/0036672 A1 | 2/2014 | Kulkarni et al. | |
| 2014/0369360 A1 | 12/2014 | Carlstrom | |
| 2015/0135209 A1* | 5/2015 | LaBosco | H04N 21/43635 725/31 |
| 2015/0334733 A1 | 11/2015 | Ren et al. | |
| 2015/0365338 A1* | 12/2015 | Pannell | H04J 3/0635 370/412 |
| 2016/0080283 A1* | 3/2016 | Alam | H04L 47/22 370/252 |
| 2016/0191973 A1* | 6/2016 | Joy | H04N 21/26216 725/75 |

OTHER PUBLICATIONS

Ali, D. M. et al. (May 2012). "Modified Priority Algorithm for Mobile WiMAX Uplink Scheduler," *Research Journal of Applied Sciences, Engineering and Technology*, 4(10): 1310-1313.

Rumpf, S. et al. (Sep. 2014). "Software Stacks for Mixed-critical Applications: Consolidating IEEE 802.1 AVB and Time-triggered Ethernet in Next-generation Automotive Electronics," *Proc. of the 4th IEEE Int. Conf. on Consumer Electronics*, Sep. 2014, Berlin, Germany; 5 pages.

Alderisi, G. et al. "Introducing Support for Scheduled Traffic over IEEE Audio Video Bridging Networks," *2013 IEEE 18th Conference on Emerging Technologies & Factory Automation (ETFA)*, Sep. 10-13, 2013, Cagliari, Italy; 9 pages.

* cited by examiner

| AUDIO AND/OR VIDEO STREAM | MAXIMUM LATENCY IN MICROSECONDS |
|---|---|
| A | 1022.56 |
| B | 1117.76 |
| C | 954.24 |
| D | 1589.28 |
| Z | 1738.24 |

SYSTEM AND METHOD FOR REAL-TIME TRANSFER OF AUDIO AND/OR VIDEO STREAMS THROUGH AN ETHERNET AVB NETWORK

CROSS-REFERENCE TO RELATED APPLICATIONS AND PRIORITY

This U.S. patent application claims priority 35 U.S.C. § 119 to Indian patent application no. 3288/MUM/2015 filed on Aug. 27, 2015. The entire contents of the aforementioned application are incorporated herein by reference.

TECHNICAL FIELD

The disclosure relates generally to transfer of audio and/or video streams, and, more particularly, to system and method for real-time transfer of the audio and/or video streams through an Ethernet audio/video bridging (AVB) network.

BACKGROUND

Typically, an audio/video bridging (AVB) technology indicates a technology which provides streaming services with comparatively smaller delay in an Institute of Electrical and Electronics Engineers (IEEE) 802 network using time-synchronization. The AVB technology may utilize a stream reservation protocol which secures a resource in a network device for an audio/video stream. In an example, a non-arbitrary network that is operating according to IEEE 802.1 Qav and/or Qbv may include a talker (or source), multiple network devices and a listener (or receiver). For example, the non-arbitrary network may be an automotive network within an automobile or a manufacturing assembly line network. The talker may transmit high-priority audio and/or video streams to the listener over the network devices during allocated transmission periods. High-priority audio and/or video streams may refer to, for example, class A or class B audio and/or video streams with low latency requirements.

In the non-arbitrary network, audio and/or video streams may have, for example, one of three to eight priority levels. The class A may include audio and/or video streams with a highest priority level. The highest priority is used to insure the lowest latency. Although the audio and/or video streams may include audio data and/or video data, AVB data may also include control data, user data, reference data, or other types of data. The highest priority level data may be provided with a predetermined amount of bandwidth and a predetermined maximum latency. This assures that the class A audio and/or video streams are transmitted during allocated time periods and latency associated with transmitting the class A audio and/or video streams is less than the predetermined maximum latency. The class B may include audio and/or video streams with a next highest priority level. All non-AVB streams use the remaining lower priority levels. In general, higher priority audio and/or video streams are transmitted before lower priority data. In such cases, even though an audio and/or video stream of class B is of a critical application, that audio and/or video stream is transmitted after transmitting class A audio and/or video streams. Thus, there may be a delay in transmitting the audio and/or video streams of the critical application which can cause damage to an automobile and so on.

SUMMARY

Embodiments of the present disclosure present technological improvements as solutions to one or more of the above-mentioned technical problems recognized by the inventors in conventional systems For example, in one embodiment, a system and method for real-time transfer of audio and/or video streams through an Ethernet audio/video bridging (AVB) network.

In one aspect, a method for real-time transfer of audio and/or video streams through an Ethernet AVB network is disclosed. In an embodiment, multiple audio and/or video streams from multiple AVB enabled devices are received by an AVB enabled network device. For example, each of the multiple AVB enabled devices has a static priority based on criticality of an application that each of the multiple AVB enabled devices is performing. Further, each of the multiple audio and/or video streams are dynamically queued, by the AVB enabled network device, based on the static priority of the associated one of the AVB enabled devices. Furthermore, real-time transfer of the multiple audio and/or video streams to a user device is enabled through an Ethernet AVB network, by the AVB enabled network device, upon queuing the multiple audio and/or video streams. In some embodiments, the multiple audio and/or video streams are dynamically re-scheduled upon receiving new audio and/or video streams from one or more of the AVB enabled devices and then real-time transfer of the dynamically re-scheduled audio and/or video streams to the user device is enabled through the Ethernet AVB network by the AVB enabled network device.

In another aspect, a system for real-time transfer of audio and/or video streams through an Ethernet AVB network is disclosed. In an embodiment, the system includes multiple AVB enabled devices and an AVB enabled network device. The multiple AVB enabled devices are communicatively coupled to the AVB enabled network device via the Ethernet AVB network. For example, each of the multiple AVB enabled devices has a static priority based on criticality of an application that each of the multiple AVB enabled devices is performing. In this embodiment, the AVB enabled network device includes one or more processors and a memory communicatively coupled to the processors. Further, the memory includes a priority based scheduling module and a multimedia transfer module. In an example, the priority based scheduling module receives multiple audio and/or video streams from the multiple AVB enabled devices. Further, the priority based scheduling module dynamically queues each of the multiple audio and/or video streams based on the static priority of the associated one of the AVB enabled devices. The multimedia transfer module then enables real-time transfer of the dynamically queued multiple audio and/or video streams to a user device through the Ethernet AVB network. In some embodiments, the priority based scheduling module dynamically re-schedules the multiple audio and/or video streams upon receiving new audio and/or video streams from one or more of the multiple AVB enabled devices. The multimedia transfer module then enables real-time transfer of the dynamically re-scheduled audio and/or video streams to the user device through the Ethernet AVB network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like pails. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims:

The terms "transfer" and "transmit" re used interchangeably throughout the document.

Figure 1:
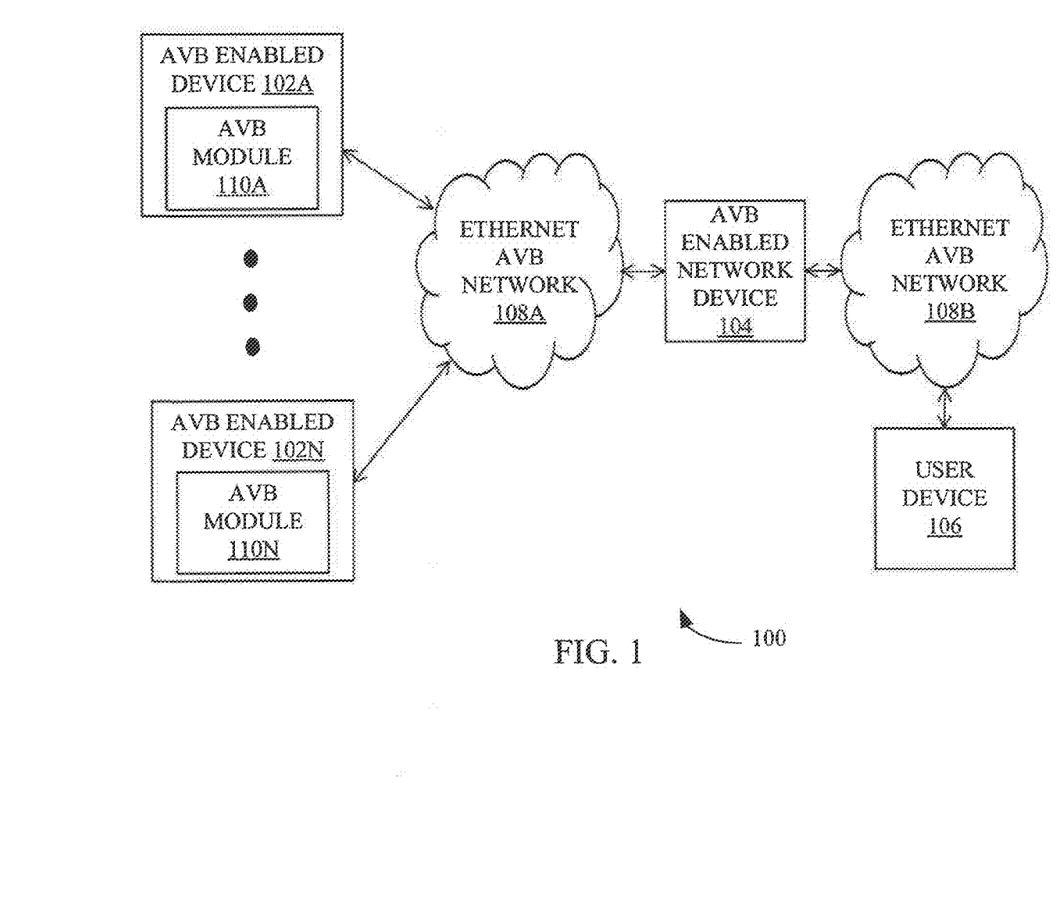
FIG. 1 illustrates a system for real-time transfer of audio and/or video streams through an Ethernet audio/video bridging (AVB) network, in accordance with some embodiments of the present disclosure.

FIG. 1 illustrates a system 100 for real-time transfer of audio and/or video streams through an Ethernet audio/video bridging (AVB) network, according to an embodiment of the present disclosure. As shown in FIG. 1, the system 100 includes multiple AVB enabled devices 102A-N, an AVB enabled network device 104 and a user device 106. For example, the multiple AVB enabled devices 102A-N include AVB enabled devices performing critical and/or non-critical applications in an automobile and so on. For example, applications with real time control data are critical applications and applications with all media oriented data are non-critical applications.

The AVB enabled network device 104 may include, not limited to, an AVB enabled network switch. The user device 106 may include, but not limited to, a mobile phone, a computing device and the like. Further, the AVB enabled devices 102A-N are communicatively coupled to the AVB enabled network device 104 via an Ethernet AVB network 108A. Furthermore, the AVB enabled network device 104 is communicatively coupled to the user device 106 via an Ethernet AVB network 1083.

Also, each of the AVB enabled devices 102A-N includes an associated AVB module 110A-N which enables the associated devices 102A-N to send audio/video streams to the AVB enabled network device 104. For example, each of the AVB enabled devices 102A-N has a static priority based on criticality of the application that each of the AVB enabled devices 102A-N is performing. In operation, the AVB enabled network device 104 receives multiple audio and/or video streams from the AVB enabled devices 102A-N. Further, the network device 104 dynamically queues the multiple audio and/or video streams based on the static priority of the associated AVB enabled device 102A-N. For example, an audio and/or video stream from an AVB enabled device has a highest priority when the AVB enabled device has the highest priority. In this example, the audio and/or video stream is queued such that the audio and/or video stream is in a first position (i.e., the first stream for transmission). Furthermore, the AVB enabled network device 104 enables real-time transfer of the multiple audio and/or video streams to the user device 106 through the Ethernet AVB network 108B upon queuing the multiple audio and/or video streams. In some embodiments, the AVB enabled network device 104 dynamically re-schedules the multiple audio and/or video streams upon receiving new audio and/or video streams from one or more of the AVB enabled devices 102A-N and then enables real-time transfer of the dynamically re-scheduled audio and/or video streams to the user device through the Ethernet AVB network. For example, upon queuing the multiple audio and/or video streams, if the AVB enabled network device 104 receives a new audio and/or video stream with a highest priority than the multiple audio and/or video streams, then the AVB enabled network device 104 dynamically re-schedules the audio and/or video streams such that the new audio and/or video stream is in a first position for transmission. This is explained in more detailed with reference to FIG. 3.

Figure 2:
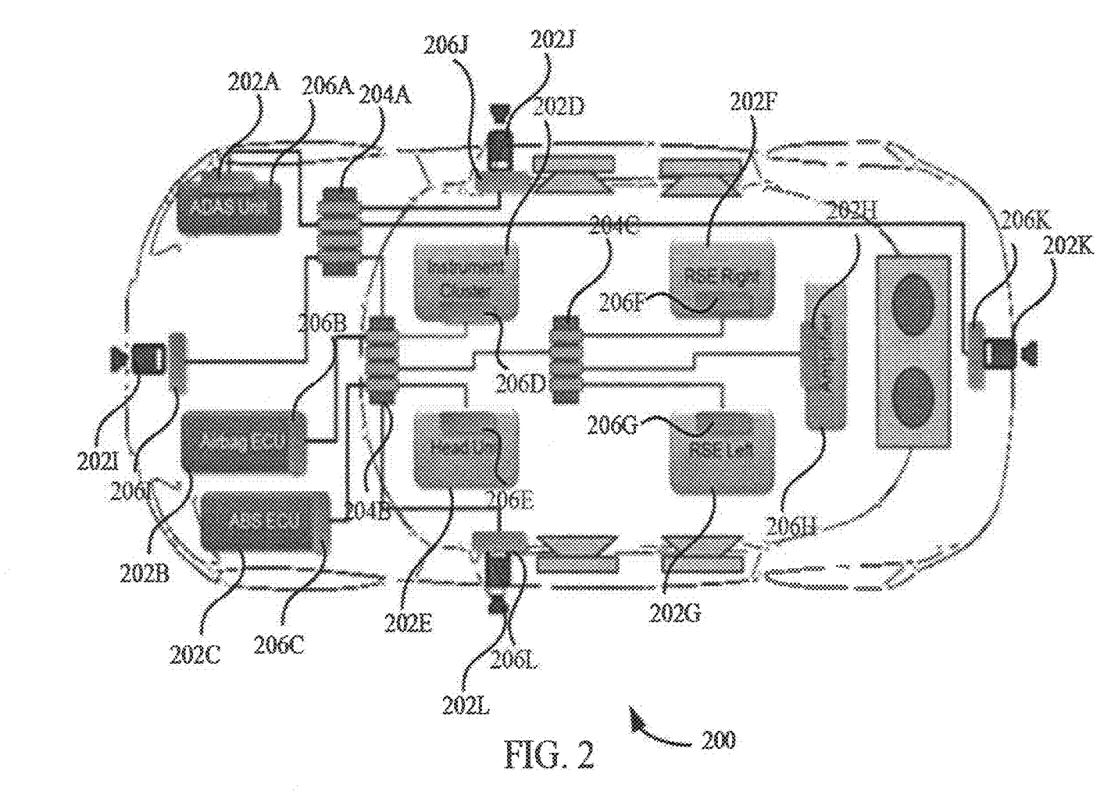
FIG. 2 illustrates an in-car system for real-ti e transfer of audio and/or video streams through an Ethernet AVB network, in accordance with some embodiments of the present disclosure.

FIG. 2 illustrates an in-car system 200 for real-time transfer of audio and/or video streams through an Ethernet AVB network, according to an embodiment of the present disclosure. As shown in FIG. 2, the system 200 includes multiple AVB enabled devices 202A-L and AVB enabled network devices 204A-C. For example, the AVB enabled devices 202A-L include an advanced driver assistance system (ADAS) unit 202A, an airbag ECU 202B, an anti-lock braking system (ABS) ECU 202C, an instrument cluster 202D, a head unit 202E, a rear seat entertainment (RSE) right 202F, a RSE left 202G, an amplifier 202H and video cameras 202I-L. Further, as shown in FIG. 2, the AVB enabled devices 202A and 202I-K are communicatively coupled to the AVB enabled network device 204A, the AVB enabled devices 202B-E and 202L are communicatively coupled to the AVB enabled network device 204B and the AVB enabled devices 202F-H are communicatively coupled to the AVB enabled network device 204C via the Ethernet AVB network (e.g., one of the Ethernet AVB network 108A and 108B of FIG. 1). Furthermore, the AVB enabled network devices 204A-C are communicatively coupled to each other. Also, each of the AVB enabled devices 202A-L includes associated AVB module 206A-L which enables the associated devices 202A-L to send audio/video streams to one or more of the network devices 204A-C. For example, each of the AVB enabled devices 202A-L has a static priority based on criticality of an application that each of the AVB enabled devices 202A-L is performing. For example, the ADAS unit 202A, airbag ECU 202B, ABS ECU 202C and video cameras 202I-L have high priority than the other devices in the automobile as the ADAS unit 202A, airbag ECU 202B, ABS ECU 202C and video cameras 202I-L perform critical control data applications in the automobile. In operation, each of the AVB enabled network devices 204A-C dynamically queues and enables real-time transfer of the incoming audio/video streams based on the static priority of the associated AVB enabled devices 202A-L via the Ethernet AVB network. This is explained in more detailed with reference to FIG. 3.

Figure 3:
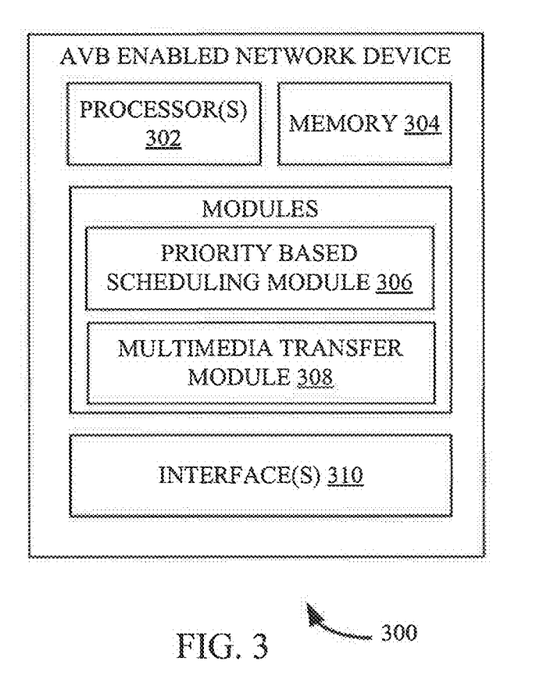
FIG. 3 illustrates an AVB enabled network device, such as the one shown in FIG. 1, according to an embodiment of the present disclosure.

FIG. 3 schematically illustrates an AVB enabled network device 300 (e.g., the network device 104 of FIG. 1 or one of the AVB enabled network devices 204A-N of FIG. 2), according to an embodiment of the present disclosure. As shown in FIG. 3, the AVB enabled network device 300 includes one or more processor(s) 302 and a memory 304 communicatively coupled to each other. The AVB enabled network device 300 also includes interface(s) 310. Further, the memory 304 includes modules, such as a priority based scheduling module 306 and a multimedia transfer module 308. Although FIG. 3 shows example components of the AVB enabled network device 300, in other implementations, the AVB enabled network device 300 may contain fewer components, additional components, different components, or differently arranged components than depicted in FIG. 3.

The processor(s) 302 and the memory 304 may be communicatively coupled by a system bus. The processor(s) 302 may include circuitry implementing, among others, audio and logic functions associated with the communication. The processor(s) 302 may include, among other things, a clock, an arithmetic logic unit (ALU) and logic gates configured to support operation of the processor(s) 302. The processor(s) 302 can be a single processing unit or a number of units all of which include multiple computing units. The processor(s) 302 may be implemented as one or more microprocessors, microcomputers, microcontrollers, digital signal processors, central processing units, state machines, logic circuitries, and/or any devices that manipulate signals based on operational instructions. Among other capabilities, the processor(s) 302 is configured to fetch and execute computer-readable instructions and data stored in the memory 304.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 310 may include a variety of software and hardware interfaces, for example, interfaces for peripheral device(s), such as a keyboard, a mouse, an external memory, and a printer. The interface(s) 310 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 310 may include one or more ports for connecting the AVB enabled network device 300 to AVB enabled devices and a user device (as shown in FIG. 1) and AVB enabled devices and other network devices (as shown in FIG. 2).

The memory 304 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 304, may store any number of pieces of information, and data, used by the AVB enabled network device 300 to implement the functions of the AVB enabled network device 300. The memory 304 may be configured to store information, data, applications, instructions or the like for enabling the AVB enabled network device 300 to carry out various functions in accordance with various example embodiments. Additionally or alternatively, the memory 304 may be configured to store instructions which when executed by the processor(s) 302 causes the AVB enabled network device 300 to behave in a manner as described in various embodiments. The memory 304 includes the priority based scheduling module 306, the multimedia transfer module 308 and other modules. The modules 306 and 308 include routines, programs, objects, components, data structures, etc., which perform particular tasks or implement particular abstract data types. The other modules may include programs or coded instructions that supplement applications and functions of the AVB enabled network device 300.

In an embodiment, the priority based scheduling module 306 receives multiple audio and/or video streams from multiple AVB enabled devices (e.g., the AVB enabled devices shown in FIG. 1 or 2). In this embodiment, each of the multiple AVB enabled devices has a static priority based on criticality of an application that each of the multiple AVB enabled devices is performing.

Further, the priority based scheduling module 306 dynamically queues the multiple audio and/or video streams based on the static priority of the associated AVB enabled device. In an example embodiment, the priority based scheduling module 306 dynamically queues the multiple audio and/or video streams such that an audio and/or video stream from one of the AVB enabled devices with a highest priority is in a first position and an audio and/or video stream from one of the AVB enabled devices with a lowest priority is in a last position. In another example embodiment, the priority based scheduling module 306 dynamically queues two or more of the multiple audio and/or video streams using a first-in first-out (FIFO) technique when the two or more of the multiple audio and/or video streams are received from one of the multiple AVB enabled devices (i.e., when the two or more of the multiple audio and/or video streams have same priority). In some embodiments, the priority based scheduling module 306 dynamically re-schedules the multiple audio and/or video streams upon receiving new audio and/or video streams from one or more of the multiple AVB enabled devices. The multimedia transfer module 308 then enables real-time transfer of the audio and/or video streams to a user device through an Ethernet AVB network upon queuing and/or re-scheduling the audio and/or video streams.

For example, consider audio and/or video streams 'A', 'B', 'C', 'D' and 'Z' are received and queued at the AVB enabled network device 300. In this example, the stream Z is time critical and has a highest priority (i.e., based on a static priority of an associated AVB enabled device), followed by 'A' having next higher priority and D' having least priority among the five streams. In this case, the queue is re-ordered/re-scheduled in such a way that the stream Z with the highest priority is transferred before the streams with less priority. Thus, a lowest latency for the highest priority stream Z is ensured without disturbing the latency of other streams. In an example, a maximum latency of each of the streams A-D and Z for seven hops is shown in a table 400A of FIG. 4A. The term latency refers to a time for a high priority stream to be transmitted through one or more hops of a non-arbitrary network. For example, the non-arbitrary network may be, for example, an automotive network within a vehicle or a manufacturing assembly line network. The latency of a single hop is measured from a time when a last bit of a high priority stream is received by the AVB enabled network device 300 for that hop to a time when the last bit is transmitted from the AVB enabled network device 300. Simply stated, the latency of a single hop is measured from the last bit into the AVB enabled network device 300 to the last bit out of the AVB enabled network device 300. A single hop may refer to an AVB enabled network device or a device of the non-arbitrary network.

Figure 4A:
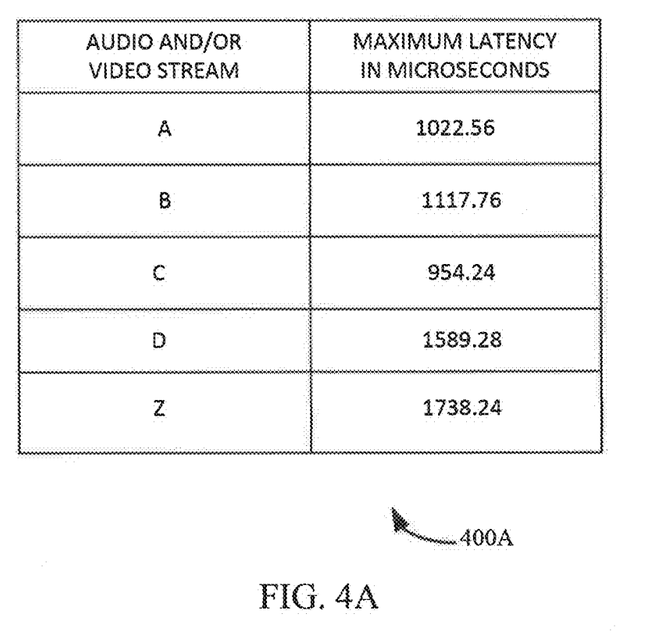
FIG. 4A is a table illustrating a latency of each of multiple audio/video streams, in accordance with some embodiments of the present disclosure.

In an example, a maximum latency for the stream Z is computed using an equation:

$$L_{zmax} = T_{md} + T_{mnfd} + T_{zmfd} \quad (1)$$

where, $L_{zmax}$ is a maximum latency to transmit a frame from the stream Z, $T_{zmfd}$ is a time to transfer the frame from the stream Z, Tmd is a media access control (MAC) delay from the "ownership of a buffer to MAC" until the MAC starts transmission, $T_{zmfd}$ is a delay to finish a maximum AVB Frame and $T_{mnfd}$ is a delay to finish a maximum non-AVB frame.

Similarly, a maximum latency for the stream A is computed using an equation:

$$L_{amax} = T_{md} + T_{mnfd} + T_{zmfd} + T_{amfd} \quad (2)$$

where, $T_{amfd}$ is a time to transmit a frame from the stream A.

Figure 4B:
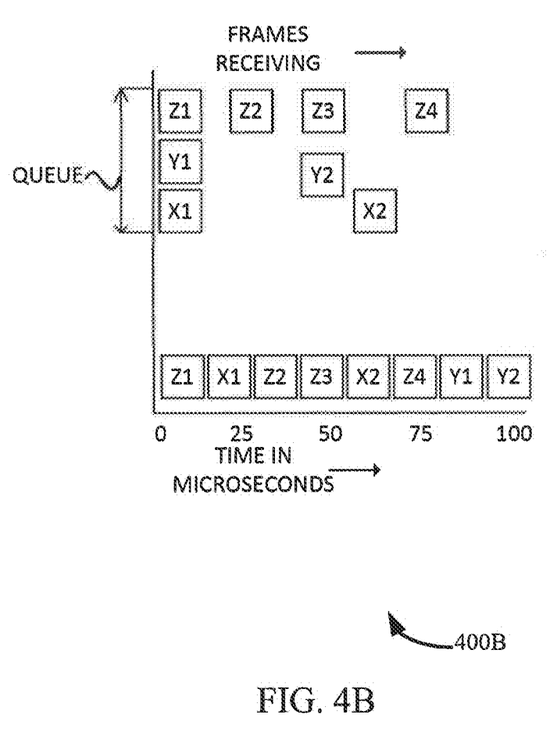
FIG. 4B is a schematic illustrating queuing and forwarding of multiple audio/video streams, in accordance with some embodiments of the present disclosure.

FIG. 4B is a schematic 400B illustrating queuing and forwarding of multiple audio/video streams, according to an embodiment of the present disclosure. FIG. 4B shows receiving frames Z1-Z4, X1-X2 and Y1-Y2 of audio and/or video streams Z, X and Y, in order of priority, at various time intervals of 25 microseconds. Further, FIG. 4B shows transferring the frames of the highest priority stream (i.e., the stream Z) before sending the frames of lowest priority streams even though the frames of lowest priority streams are received before the frames of the highest priority stream.

Figure 5:
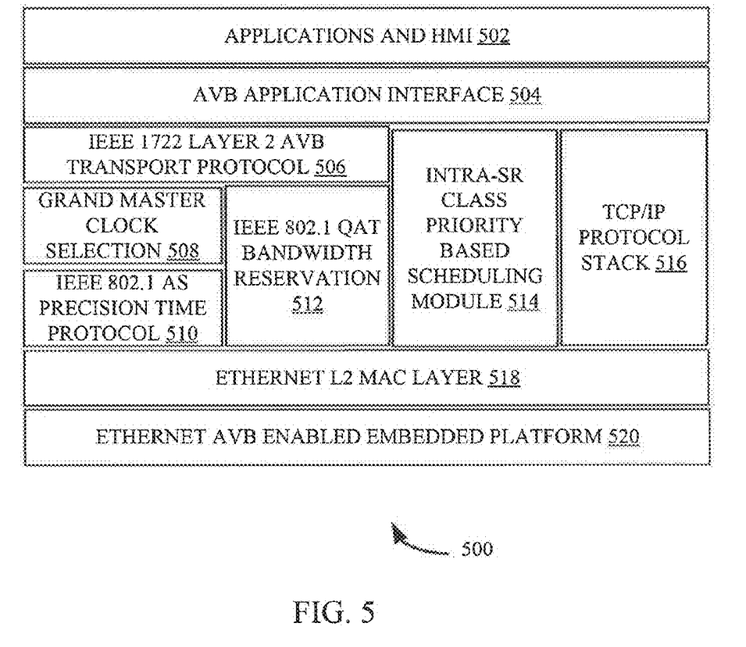
FIG. 5 illustrates an Ethernet AVB architecture, in accordance with some embodiments of the present disclosure.

FIG. 5 illustrates an Ethernet AVB architecture 500, according to an embodiment of the present disclosure. As shown in FIG. 5, the Ethernet AVB architecture 500 includes applications and human machine interface (HMI) 502, an AVB application interface 504, an Institute of Electrical and Electronics Engineers (IEEE) 1722 layer 2 AVB transport protocol 506, grand master clock selection 508, IEEE 802.1 AS precision time protocol 510, IEEE 802.1 Qat bandwidth reservation 512, an intra-stream reservation (SR) class priority based scheduling module 514, a Transmission Control Protocol/Internet Protocol (TCP/IP) protocol stack 516, an Ethernet L2 MAC layer 518, and an Ethernet AVB enabled embedded platform 520. In an example, The AVB Standard defined by IEEE 802.1 audio/video bridging task group provides the specifications for time-synchronized low latency streaming services through 802 networks. In an example embodiment, the intra-SR class priority based scheduling module 514 includes the priority based scheduling module 306 and the multimedia transfer module 308 for enabling real-time transfer of audio and/or video streams based on static priority of associated AVB enabled devices through an Ethernet AVB network. This is explained in more detailed with reference to FIGS. 1-4B.

Figure 6:
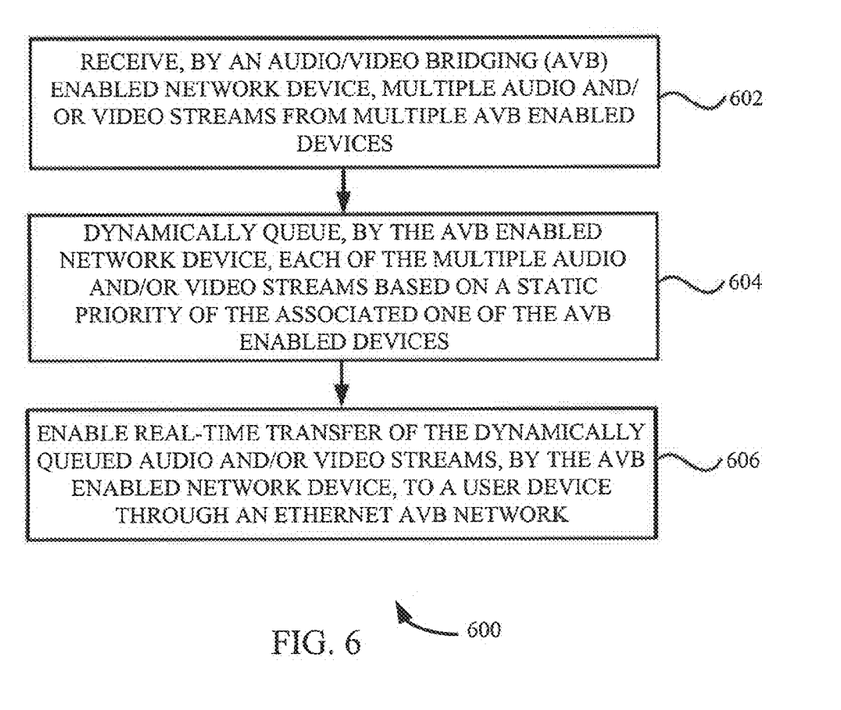
FIG. 6 is a flow diagram illustrating a method for real-time transfer of audio and/or video streams through an Ethernet AVB network, in accordance with some embodiments of the present disclosure.

FIG. 6 is a flow chart 600 illustrating a method for real-time transfer of audio and/or video streams through an Ethernet AVB network, according to an embodiment of the present disclosure. At block 602, multiple audio and/or video streams are received, by an AVB enabled network device (e.g., the AVB enabled network device 104 of FIG. 1 or one of the AVB enabled network devices 204A-N of FIG. 2 or the AVB enabled network device 300 of FIG. 3), from multiple AVB enabled devices. Each of the AVB enabled devices has a static priority based on criticality of an application that each of the multiple AVB enabled devices is performing. For example, the AVB enabled devices include AVB enabled devices performing critical or non-critical applications in an automobile and so on. The AVB enabled network device includes an AVB enabled network switch and the like.

At block 604, each of the audio and/or video streams are dynamically queued, by the AVB enabled network device, based on the static priority of the associated AVB enabled device. In an example embodiment, the multiple audio and/or video streams are dynamically queued, by the AVB enabled network device, such that an audio and/or video stream from the one of the AVB enabled devices with a highest priority is in a first position and an audio and/or video stream from one of the AVB enabled devices with a lowest priority is in a last position. In another example embodiment, two or more of the multiple audio and/or video streams are dynamically queued, by the AVB enabled network device, using a first-in first-out (FIFO) technique when the two or more of the multiple audio and/or video streams are received from one of the multiple AVB enabled devices. In some embodiments, the multiple audio and/or video streams are dynamically re-scheduled, by the AVB enabled network device, upon receiving new audio and/or video streams from one or more of the multiple AVB enabled devices.

At block 606, real-time transfer of the audio and/or video streams to a user device is enabled, by the AVB enabled network device, through the Ethernet AVB network upon queuing and/or re-scheduling the audio and/or video streams. In some embodiments, real-time transfer of the audio and/or video streams to other network device is enabled, by the AVB enabled network device, through the Ethernet AVB network upon queuing and/or re-scheduling the multiple audio and/or video streams. This is explained in more detailed with reference to FIGS. 1-4B.

The order in which the method(s) are described is not intended to be construed as a limitation, and any number of the described method blocks can be combined in any order to implement the method 600, or an alternative method. Additionally, individual blocks may be deleted from the methods without departing from the spirit and scope of the subject matter described herein. Furthermore, the method 600 can be implemented in any suitable hardware, software, firmware, or combination thereof.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

In various embodiments of FIGS. 1-6, a technique for AVB to handle both time critical applications along with non-critical applications over Ethernet network is disclosed. The proposed technique uses a static priority of each AVB enabled device, which is based on criticality of an application, to queue and transfer audio and/or video streams, in real-time. Thus, reducing the latency for the time critical applications with no difference in the latency of other non-time critical applications. The proposed technique may be effective in an AVB enabled network device (i.e., a bridge) as a large number of streams are being scheduled in the network device. For example, in an in-car system with multiple hops, the proposed technique reduces latency for time critical streams and ensures expected strict deterministic behavior. In this example, the proposed technique ensures the latency requirements of time-critical applications performed by braking systems, airbag control, sensors etc., in an automobile. Also, the proposed technique is common heterogeneous network backbone serving both multimedia and safety critical applications. Also, the proposed technique may avoid having per class queues, so the redundancy of the queue operation can be reduced.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method, comprising:
   receiving, by an audio/video bridging (AVB) enabled network device, multiple audio and/or video streams from multiple AVB enabled devices, wherein each of the multiple AVB enabled devices has a static priority based on criticality of an application that each of the multiple AVB enabled devices is performing, wherein a latency of the application handling a critical data is reduced with no difference in the latency of the application handling a non-critical data;
   dynamically queuing, by the AVB enabled network device, each of the multiple audio and/or video streams based on the static priority of the associated one of the multiple AVB enabled devices;
   enabling real-time transfer of the multiple audio and/or video streams, by the AVB enabled network device, to a user device through an Ethernet AVB network upon queuing the multiple audio and/or video streams; and
   dynamically re-scheduling the multiple audio and/or video streams, by the AVB enabled network device, upon receiving new audio and/or video streams from one or more of the multiple AVB enabled devices, wherein the re-scheduling comprises re-ordering of the queue.

2. The method of claim 1, wherein dynamically queuing, by the AVB enabled network device, each of the multiple audio and/or video streams based on the static priority of the associated one of the multiple AVB enabled devices, comprises:
   dynamically queuing, by the AVB enabled network device, the multiple audio and/or video streams such that an audio and/or video stream from one of the multiple AVB enabled devices with a highest priority is in a first position and an audio and/or video stream from one of the multiple AVB enabled devices with a lowest priority is in a last position.

3. The method of claim 1, wherein dynamically queuing, by the AVB enabled network device, each of the multiple audio and/or video streams based on the static priority of the associated one of the multiple AVB enabled devices, comprises:
   dynamically queuing, by the AVB enabled network device, two or more of the multiple audio and/or video streams using a first-in first-out (FIFO) technique when the two or more of the multiple audio and/or video streams are received from one of the multiple AVB enabled devices.

4. The method of claim 1, wherein enabling real-time transfer of the multiple audio and/or video streams, by the AVB enabled network device, to the user device, comprises:
   enabling real-time transfer of the dynamically re-scheduled audio and/or video streams, by the AVB enabled network device, to the user device through the Ethernet AVB network.

5. The method of claim 1, wherein the multiple AVB enabled devices comprise AVB enabled devices performing critical or non-critical applications in an automobile and wherein the AVB enabled network device comprises an AVB enabled network switch.

6. A system comprising:
   multiple audio/video bridging (AVB) enabled devices, wherein each of the multiple AVB enabled devices has a static priority based on criticality of an application that each of the multiple AVB enabled devices is performing, wherein a latency of the application handling a critical data is reduced with no difference in the latency of the application handling a non-critical data; and
   an AVB enabled network device, wherein the multiple AVB enabled devices are communicatively coupled to the AVB enabled network device via an Ethernet AVB network and wherein the AVB enabled network device comprises:
   at least one processor; and
   a memory communicatively coupled to the at least one processor, wherein the memory comprises:

a priority based scheduling module to:
   receive multiple audio and/or video streams from the multiple AVB enabled devices;
   dynamically queue each of the multiple audio and/or video streams based on the static priority of the associated one of the multiple AVB enabled devices; and
   dynamically re-schedule the multiple audio and/or video streams upon receiving new audio and/or video streams from one or more of the multiple AVB enabled devices, wherein the re-scheduling comprises re-ordering of the queue; and
a multimedia transfer module to:
   enable real-time transfer of the dynamically queued multiple audio and/or video streams to a user device through the Ethernet AVB network.

7. The system of claim 6, wherein the priority based scheduling module dynamically queues the multiple audio and/or video streams such that an audio and/or video stream from one of the multiple AVB enabled devices with a highest priority is in a first position and an audio and/or video stream from one of the multiple AVB enabled devices with a lowest priority is in a last position.

8. The system of claim 6, wherein the priority based scheduling module dynamically queues two or more of the multiple audio and/or video streams using a first-in first-out (FIFO) technique when the two or more of the multiple audio and/or video streams are received from one of the multiple AVB enabled devices.

9. The system of claim 6, wherein multimedia transfer module enables real-time transfer of the dynamically re-scheduled audio and/or video streams to the user device through the Ethernet AVB network.

10. The system of claim 6, wherein the multiple AVB enabled devices comprise AVB enabled devices performing critical and/or non-critical applications in an automobile and wherein the AVB enabled network device comprises an AVB enabled network switch.

11. A non-transitory computer readable medium embodying a program executable in a computing device for providing collaboration of plurality of enterprises to process a plurality of transactions, the program comprising:
   a program code for receiving, by an audio/video bridging (AVB) enabled network device, multiple audio and/or video streams from multiple AVB enabled devices, wherein each of the multiple AVB enabled devices has a static priority based on criticality of an application that each of the multiple AVB enabled devices is performing, wherein a latency of the application handling a critical data is reduced with no difference in the latency of the application handling a non-critical data;
   a program code for dynamically queuing, by the AVB enabled network device, each of the multiple audio and/or video streams based on the static priority of the associated one of the multiple AVB enabled devices;
   a program code for enabling real-time transfer of the multiple audio and/or video streams by the AVB enabled network device, to a user device through an Ethernet AVB network upon queuing the multiple audio and/or video streams; and
   a program code for dynamically re-scheduling the multiple audio and/or video streams, by the AVB enabled network device, upon receiving new audio and/or video streams from one or more of the multiple AVB enabled devices, wherein the re-scheduling comprises re-ordering of the queue.

* * * * *